United States Patent
Auger et al.

(10) Patent No.: US 10,557,231 B2
(45) Date of Patent: Feb. 11, 2020

(54) METHOD FOR COLORING CELLULOSE

(71) Applicant: COMMISSARIAT A L'ENERGIE ATOMIQUE ET AUX ENERGIES ALTERNATIVES, Paris (FR)

(72) Inventors: Aurélien Auger, Grenoble (FR); Olivier Poncelet, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 72 days.

(21) Appl. No.: 15/128,001

(22) PCT Filed: Mar. 19, 2015

(86) PCT No.: PCT/IB2015/052018
§ 371 (c)(1),
(2) Date: Sep. 21, 2016

(87) PCT Pub. No.: WO2015/140750
PCT Pub. Date: Sep. 24, 2015

(65) Prior Publication Data
US 2017/0096773 A1    Apr. 6, 2017

(30) Foreign Application Priority Data

Mar. 21, 2014 (FR) ..................... 14 52406

(51) Int. Cl.
| | |
|---|---|
| *D06P 1/94* | (2006.01) |
| *D06P 3/60* | (2006.01) |
| *D06P 1/649* | (2006.01) |
| *D21H 21/28* | (2006.01) |
| *D21C 9/00* | (2006.01) |
| *C08B 15/06* | (2006.01) |

(52) U.S. Cl.
CPC .............. *D06P 1/94* (2013.01); *C08B 15/06* (2013.01); *D06P 1/6491* (2013.01); *D06P 3/60* (2013.01); *D21C 9/005* (2013.01); *D21H 21/28* (2013.01)

(58) Field of Classification Search
CPC . D06P 1/94; D06P 1/6491; D06P 3/60; C08B 15/06; D21C 9/005; D21H 21/28
See application file for complete search history.

(56) References Cited

U.S. PATENT DOCUMENTS

| | | | | |
|---|---|---|---|---|
| 3,418,063 A | * | 12/1968 | Ulrich ................... | D06P 1/6491 8/532 |
| 3,788,811 A | * | 1/1974 | Sievenpiper et al. .. | D06P 1/928 8/491 |
| 5,578,088 A | | 11/1996 | Schrell et al. | |
| 6,010,542 A | | 1/2000 | DeYoung et al. | |
| 6,620,211 B2 | | 9/2003 | Veugelers et al. | |

FOREIGN PATENT DOCUMENTS

| | | | | |
|---|---|---|---|---|
| CN | 102702364 A | | 10/2012 | |
| CN | 103541247 | * | 1/2014 | ............. D06P 3/872 |
| DE | 4332219 A1 | | 3/1994 | |
| GB | 009218933 | * | 10/1992 | ............ D06P 1/0004 |
| GB | 2259525 | * | 3/1993 | ................ D06P 3/60 |
| WO | 2006/107191 A1 | | 10/2006 | |

OTHER PUBLICATIONS

Yin et al. Chemical modification of cotton cellulose in supercritical carbon dioxide: Synthesis and characterization of cellulose carbamate. Carbohydrate Polymers, 67, 2001, p. 147-154.*
Jun. 5, 2015 International Search Report issued in International Patent Application No. PCT/IB2015/052018.
E. Wertheim; "Derivatives of Dulcin;" JACS; Jan. 1931; vol. 53; No. 1; pp. 200-203.
Cuiyu Yin et al; "Chemical modification of cotton cellulose in supercritical carbon dioxide: Synthesis and characterization of cellulose carbamate;" Carbohydrate Polymers; 2007: vol. 67; pp. 147-154.

* cited by examiner

*Primary Examiner* — Amina S Khan
(74) *Attorney, Agent, or Firm* — Oliff PLC

(57) ABSTRACT

A method for coloring of cellulose in a supercritical $CO_2$ medium by an uncharged hydrophobic dye, including at least the steps including of: (i) provision of cellulose fibers, (ii) placing the cellulose fibers in the presence of: a) an effective quantity of at least one uncharged mono organo-urea primer of formula R—NH—CO—$NH_2$, where R represents a linear or branched, saturated or unsaturated, hydrocarbon chain possessing at least 3 carbon atoms, or a saturated or unsaturated cyclic hydrocarbon radical, which is bonded directly or via a methylene or ethylene group to a nitrogen atom, and if appropriate substituted under conditions conducive to the forming of a covalent carbamatic bond between the cellulose and the molecules of the organo-urea; and b) at least one hydrophobic dye in a supercritical $CO_2$ medium, under conditions conducive to the immobilization of the dye on the fibers.

18 Claims, No Drawings

METHOD FOR COLORING CELLULOSE

The present invention relates to a novel process for coloring paper cellulose.

Processes for coloring cellulose, in the paper industry or the textile industry, are conventionally performed in aqueous medium. In general, the fixing of the dye to the cellulose fibers requires the use of large amounts of salts and of ammonia, to overcome the anionic repulsion between the dye and the cellulose. Now, these salts and ammonia, and similarly side products formed in conjunction, are commonly removed by washing at the end of the reaction. The large amounts of water required for this washing operation are thus highly polluted and their complex treatment raises, for obvious reasons, a major economic and environmental problem.

There is thus a great need for a more ecological process for coloring cellulose fibers.

The use of supercritical $CO_2$ is an advantageous alternative for replacing water in processes for coloring cellulose fibers. The terms "supercritical $CO_2$" and "$sCO_2$" will be used without discrimination in the rest of the text.

Supercritical $CO_2$ has many advantages over other solvents. It is cheap, nontoxic, nonflammable, chemically inert and environmentally friendly. It is a very good solvent for hydrophobic and nonpolar chemical compounds. Due to its high diffusivity, its high density and its low viscosity, it facilitates the penetration of dye into cellulose fibers, which makes it possible to reduce the reaction time. The dyed cellulose obtained does not require drying, which allows a large amount of energy to be saved. Advantageously, the dye concentration required is lower than that required for a dyeing process in aqueous medium. Furthermore, the dye not fixed to a cellulose fiber can be readily separated out and recovered at the end of the reaction by simply reducing the pressure of the supercritical $CO_2$. The $CO_2$ and the dye can thus be reused.

However, since supercritical $CO_2$ is a good solvent for hydrophobic and uncharged compounds, it only has little affinity for cellulose, which is itself rather hydrophilic and polar.

Alternatives have already been proposed to overcome this affinity defect.

Thus, U.S. Pat. No. 6,620,211 describes a method for coloring textile material, in $sCO_2$ medium, with dyes that are reactive toward textile fibers in the presence of a hydrating agent.

For its part, U.S. Pat. No. 6,010,542 describes a method for coloring a substrate, in particular textile fibers, in $sCO_2$ medium and in the presence of a surfactant. This method does not require high temperatures or high pressures, but requires a reaction medium that is acidic via the use of additives such as carboxylic acid. However, acidic conditions damage the cellulose fibers and are even incompatible with paper cellulose.

Another alternative consists in synthesizing novel cellulose derivatives that have distinct physicochemical properties and in particular hydrophobic properties, unlike native cellulose.

Thus, various approaches have already been explored in an attempt to modify the properties of cotton cellulose fibers, for example, and to make them more hydrophobic.

A first approach consists in forming a cellulose xanthogenate, but the process also forms hazardous byproducts such as $CS_2$, $H_2S$ and heavy metals.

A second approach consists in combining cellulose with copper and ammonia, but this process also comes up against environmental obstacles.

Another approach, which is more environmentally friendly, is the NMMO technique. This consists of a solvent system comprising cyclic amine oxides, in particular N-methylmorpholine N-oxide (NMMO), which is capable of dissolving not only cellulose but also other polymers.

Yin, C. et al. [1] propose, for their part, to take advantage of the properties of supercritical $CO_2$ to synthesize a cotton cellulose carbamate, which is the product of esterification of cellulose with urea.

U.S. Pat. No. 5,578,088 also describes a method for coloring the cellulose fibers of a textile, in supercritical $CO_2$ medium, by modifying them beforehand by covalent coupling with amine derivatives. These groups can make the cellulose compatible with hydrophobic dyes. However, the amine compounds under consideration are of very complex chemical formulae.

As regards EP 1 809 806, it describes a method for coloring cellulose fibers of a textile, in supercritical $CO_2$ medium, by pretreating them with a hydrogen bond-acceptor compound, preferably an alcohol. This method does not require any surfactant, but requires the use of an acidic medium, for example $H_3PO_4$, which damages the cellulose and is incompatible with paper cellulose in particular.

Consequently, the techniques currently available are not entirely satisfactory and there remains a need for a simple process for efficiently coloring cellulose fibers, especially of paper, in supercritical $sCO_2$, and under conditions that are compatible with their integrity.

The present invention is precisely directed toward proposing a process that satisfies the abovementioned requirements.

Thus, the present invention relates to a process for coloring cellulose in supercritical $CO_2$ medium with a hydrophobic dye, comprising at least the steps consisting in:
(i) providing cellulose fibers,
(ii) placing said cellulose fibers in contact with:
   a) an effective amount of at least one uncharged primary monoorganourea, substituted with a linear or branched, saturated or unsaturated hydrocarbon-based chain, bearing at least 3 carbon atoms, or with a saturated or unsaturated cyclic hydrocarbon-based radical, bonded directly or via a methylene or ethylene group to the nitrogen atom, which are, where appropriate, substituted, under conditions suitable for establishing a covalent bond of carbamate type between the cellulose and each molecule of said organourea; and
   b) at least one hydrophobic dye, in supercritical $CO_2$ medium, under conditions suitable for immobilizing said dye on said fibers.

In particular, the present invention relates to a process for coloring cellulose in supercritical $CO_2$ medium with a hydrophobic dye, comprising at least the steps consisting in:
(i) providing cellulose fibers,
(ii) placing said cellulose fibers in contact with:
   a) an effective amount of at least one uncharged primary monoorganourea of formula R—NH—CO—$NH_2$, in which R features a linear or branched, saturated or unsaturated hydrocarbon-based chain, bearing at least 3 carbon atoms, or a saturated or unsaturated cyclic hydrocarbon-based radical, bonded directly or via a methylene or ethylene group to the nitrogen atom, which are, where appropriate, substituted, under conditions suitable for establishing a covalent bond of carbamate type between the cellulose and each molecule of said organourea; and b) at least one hydrophobic dye, in supercritical $CO_2$ medium, under conditions suitable for immobilizing said dye on said fibers.

According to a first embodiment, the operations for placing in contact under consideration in steps (a) and (b) are performed successively.

According to this embodiment, two variants may be considered.

According to a first variant, the placing in contact of the cellulose fibers with the primary organourea in step a) is also performed in supercritical $CO_2$ medium.

According to a second variant, it is performed in a solvent medium other than supercritical $CO_2$. This variant may especially be performed in solvent medium in the presence, for example, of DMSO.

According to a second embodiment, the placing in contact of the cellulose fibers with the primary organourea is performed concomitantly with the placing in contact of the hydrophobic dye under consideration.

The invention is also directed toward a material formed totally or partly from cellulose, colored according to the process of the invention, in particular a paper.

Contrary to all expectation, the inventors have discovered that it is possible to fix, with improved efficacy, one or more hydrophobic dyes onto cellulose fibers in supercritical $CO_2$ medium, provided that said fibers are used therein in a modified form with an uncharged primary organourea substituted with a saturated or unsaturated, linear or branched hydrocarbon-based chain, bearing at least three carbon atoms, or with a saturated or unsaturated cyclic hydrocarbon-based radical, bonded directly or via a methylene or ethylene group to the nitrogen atom, which are, where appropriate, substituted, under conditions suitable for establishing a covalent bond of carbamate type between the cellulose and each molecule of said organourea.

The process of the invention proves to be advantageous in several respects. Firstly, it is performed at a non-acidic pH, and in particular at a pH greater than or equal to 7. Thus, the process according to the invention does not require acidic conditions to activate the dye and to accelerate its reaction with the cellulose and, in this respect, is particularly advantageous for coloring paper cellulose fibers.

The process according to the invention does not require the use of surfactant either.

The use of an organourea in accordance with the invention makes it possible, by interacting with the cellulose fibers, to give them significant hydrophobic nature. The nitrogen atoms of the organourea also constitute potential sites for immobilizing the dye. In addition, on becoming fixed to the cellulose fibers, the organourea molecules also contribute toward facilitating the accessibility of these fibers to the dye.

The process is ecological. It takes place in $sCO_2$ medium, and does not require the use of water.

It advantageously makes it possible to avoid the formation of environmentally unfriendly byproducts, and to dispense with the washing step that is required in the standard process described previously.

By virtue of its high diffusivity, its high density and its low viscosity, $sCO_2$ facilitates the penetration of the dye into the cellulose fibers, which makes it possible to reduce the reaction time.

The colored cellulose obtained does not need to be dried, which also allows a large saving in energy.

Finally, the dye concentration required is lower than that required for a coloring process in aqueous medium. What is more, the dye that has not been fixed can be readily separated out and recovered at the end of the reaction by simply reducing the pressure of the supercritical $CO_2$. The $CO_2$ and this excess dye may thus be reused.

Other characteristics, advantages and methods for applying the process according to the invention will emerge more clearly on reading the description that follows, which is given as a nonlimiting illustration.

In the rest of the text, the expressions "between . . . and . . . ", "ranging from . . . to . . . " and "varying from . . . to . . . " are equivalent and are intended to mean that the limits are included, unless otherwise mentioned.

Unless otherwise mentioned, the expression "comprising a" should be understood as meaning "comprising at least one".

Cellulose

Cellulose is a natural linear polysaccharide. It represents the most abundant and regenerable biopolymer. It is the main constituent of plants and in particular of their cell walls. This biopolymer consists of a succession of β-D-glucopyranoside units linked together via β-1,4-glycoside bonds. Combined cellulose macromolecules form microfibrils, which, themselves, combined in layers, form macrofibrils and then cellulose fibers. Hydrogen bonds are established between the glucose molecules of the various chains.

Its properties are determined by the presence of many intramolecular hydrogen bonds and by its partially crystalline and partially amorphous structure.

Thus, by virtue of the presence of its numerous hydroxyl groups, cellulose is polar and hydrophilic.

Moreover, due to its structural characteristics, cellulose is insoluble in standard organic solvents, and has no intrinsic affinity for dyes, which are for the most part hydrophobic.

The modification of cellulose, under consideration according to the invention, makes it possible precisely to give it affinity for hydrophobic dye molecules, without impairing the integrity of its fibers.

In the case of paper in particular, the cellulose fibers are, in point of fact, more fragile than in cotton, for example, and their treatment proves to be more difficult. Paper cellulose is, for example, incompatible with treatment in acidic medium.

In the context of the invention, this hydrophobic nature is established via the formation of cellulose carbamate units, R—NH—CO—O-cellulose, produced by the reaction between cellulose and a primary organourea with R representing the residue of the organourea under consideration.

Primary Monoorganourea

In the context of the present invention, the organourea required for modifying the properties of cellulose is a primary monoorganourea.

Contrary to all expectation, the inventors found, in point of fact, that this type of urea proves to be more advantageous than secondary and tertiary organoureas.

Advantageously, the primary organourea is substituted with a carbon-based unit that is capable of giving the modified cellulose a sufficiently hydrophobic nature allowing it to be soluble in $sCO_2$ and to interact with the hydrophobic dye molecules.

A monoorganourea that is suitable for use in the invention may be of formula R—NH—CO—$NH_2$ in which R features a saturated or unsaturated, linear or branched hydrocarbon-based chain bearing at least 3 carbon atoms or a saturated or unsaturated cyclic hydrocarbon-based radical bonded directly or via a methylene or ethylene group to the nitrogen atom, which are, where appropriate, substituted.

For the purposes of the invention, the term "hydrocarbon-based" qualifies the fact that the unit under consideration is essentially constituted of carbon and hydrogen atoms. Where appropriate, heteroatoms may, however, also be present.

According to a first variant, R features an alkyl chain bearing at least 6 carbon atoms and preferably at least 8 carbon atoms.

Preferably, the hydrocarbon-based chain R bears a saturated linear backbone comprising from 6 to 12 carbon atoms.

Where appropriate, the hydrocarbon-based chain R may comprise one or more heteroatoms such as oxygen.

According to a second variant, R features an at least $C_6$ cyclic radical and preferably an aromatic radical. It may especially be a heterocycle or a heteroaromatic ring, the heteroatom possibly being an oxygen, sulfur or nitrogen atom.

The substituents that may be present may be chosen especially from halogen atoms, alkyl or alkoxy radicals, especially of $C_1$ to $C_5$, and saturated or unsaturated $C_4$ to $C_6$ rings or heterocycles.

Needless to say, these substituents are chosen for their inertness with regard to the interactions, on the one hand, between the cellulose and the organourea, and, on the other hand, between the cellulose thus modified and the dyes to be immobilized, which are required according to the invention.

A person skilled in the art is capable of making this choice.

According to another of its specificities, the organourea according to the invention is uncharged, or, in other words, is not in ionic form.

Advantageously, the organoureas that are capable of modifying the cellulose according to the process of the invention are chosen from:
 octylurea,
 octadecylurea,
 4-methoxyphenylurea,
 N-phenylurea,
 benzylurea,
 butylurea,
 allylurea, and
 3-fluorophenylurea.

Some of these products, especially such as 4-methoxyphenylurea, are marketed products.

In all cases, they are accessible by synthesis. Reference may be made especially to the process described by Wertheim, E. [2].

According to a particular embodiment, the concentration of primary organourea that is suitable for modifying the cellulose is between 1% and 20% by weight relative to the weight of cellulose to be treated.

Dye

According to a particular embodiment, the dye molecule is hydrophobic, uncharged and bears a chromophoric group.

In particular, the dyes that may be considered according to the invention are:
 triazine dyes, for example 4,4',4"-s-triazine-2,4,6-triyl-tribenzoic acid,
 carbonyl dyes, for example 1,4-bis(pentylamino)anthraquinone sold under the name Oil Blue N® by the company Sigma-Aldrich,
 sulfur-based dyes, for example the cyclic anhydride of 2-sulfobenzoic acid, or phenol red sold, for example, by the company Sigma-Aldrich,
 anthraquinone dyes, for example sodium 1-amino-9,10-dihydro-9,10-dioxo-4-(2,4,6-trimethylanilino)anthracene-2-sulfonate as sold by the company Sigma-Aldrich under the name Acid Blue 129®, 1-aminoanthraquinone, or sodium 3,4-dihydroxy-9,10-dioxo-2-anthracenesulfonate sold under the name Alizarin Red S® by the company Sigma-Aldrich, and
 azo dyes, for example N-ethyl-N-(2-hydroxyethyl)-4-(4-nitrophenylazo) -aniline as sold under the name Disperse Red 1® by the company Sigma-Aldrich, 2,2'-[[4-[(4-nitrophenyl)azo]phenyl]imino]bisethanol sold under the name Disperse Red 19® by the company Sigma-Aldrich, 2-[4-(2-chloro-4-nitrophenylazo)-N-ethylphenylamino]ethanol sold under the name Disperse Red 13® by the company Sigma-Aldrich, 4-(4-nitrophenylazo)aniline as sold under the name Disperse Orange 3® by the company Sigma-Aldrich, or N-ethyl-1-(4-(phenylazo)phenylazo)-2-naphthylamine sold under the name Sudan Red 7B® by the company Sigma-Aldrich.

More particularly, the dye is chosen from Foron Bleu RD-E® sold by the company Clariant, 2-[4-(2-chloro-4-nitrophenylazo)-N-ethylphenylamino]ethanol sold under the name Disperse Red 13® by the company Sigma-Aldrich, and 4-(2-hydroxy-5-methylphenylazo)acetanilide as sold under the name Disperse Yellow 3® by the company Sigma-Aldrich.

The concentration of dye is advantageously between 1% and 20% by weight relative to the weight of cellulose to be treated.

Supercritical $CO_2$

By virtue of its properties, supercritical $CO_2$ has many advantages over other solvents. In particular, since the critical point of $CO_2$ is at 31° C., it is possible to work at low temperature and thus to avoid denaturing the product to be treated.

Its solubility may be modulated as a function of its temperature and its pressure.

By virtue of its high diffusivity, its high density and its low viscosity, it facilitates the penetration of dye molecules into the cellulose fibers, which makes it possible to reduce the reaction time, but also the amount of dye required for coloring the cellulose, when compared with a conventional process in liquid solvent medium.

Moreover, at the end of the reaction, the reaction products and the $CO_2$ can be readily separated and recovered by simply reducing the pressure of the supercritical $CO_2$, which reverts to $CO_2$ gas. Thus, the $CO_2$ and the excess dye can be reused. The $CO_2$ in particular can be reused virtually infinitely.

The Process: Modification and Coloring of Cellulose

The present invention is directed toward a process for coloring cellulose in supercritical $CO_2$ with a hydrophobic dye, comprising at least the steps consisting in:
 (i) providing cellulose fibers
 (ii) placing said cellulose fibers in contact with:
  a) an effective amount of at least one uncharged primary monoorganourea, substituted with a linear or branched, saturated or unsaturated hydrocarbon-based chain, bearing at least 3 carbon atoms, or with a saturated or unsaturated cyclic hydrocarbon-based radical, bonded directly or via a methylene or ethylene group to the nitrogen atom, which are, where appropriate, substituted, under conditions suitable for establishing a covalent bond of carbamate type between the cellulose and each molecule of said organourea; and
  b) at least one hydrophobic dye, in supercritical $CO_2$ medium, under conditions suitable for immobilizing said dye on said fibers.

In particular, the primary monoorganourea is uncharged, of formula R—NH—CO—NH$_2$, in which R features a linear or branched, saturated or unsaturated hydrocarbon-based chain, bearing at least 3 carbon atoms, or a saturated or unsaturated cyclic hydrocarbon-based radical, bonded directly or via a methylene or ethylene group to the nitrogen atom, which are, where appropriate, substituted.

Preferably, the supercritical $CO_2$ medium is generated in situ by heating under pressure of liquid $CO_2$.

Moreover, the operations for placing in contact under consideration in steps a) and b) are advantageously performed in the same reactor.

According to a first embodiment, the operations for placing in contact under consideration in steps (a) and (b) are performed successively.

Under these circumstances, cellulose is first treated with the primary organourea, in $sCO_2$ medium or otherwise, to form a cellulose carbamate R—NH—CO—O-cellulose. The alkyl chains R thus introduced at the surface of the cellulose fibers have the advantage of giving the cellulose hydrophobic properties and of also representing sites that are accessible to the dye, on which said dye can be immobilized, via interactions of Van der Waals type.

If the interaction is performed in supercritical $CO_2$ medium, it is generally performed in an autoclave. This type of reactor is charged with cellulose and a primary organourea as defined previously. The reactor is sealed and then charged with liquid $CO_2$. In particular, the temperature and pressure conditions are adjusted, inside the reactor, until a temperature and pressure are reached for which the liquid $CO_2$ is converted into supercritical $CO_2$. After stabilizing the system, the reactor is kept under these conditions so as to allow good diffusion and homogeneous distribution of the hydrophobic organourea molecules to the core of the cellulose substrate, and to form the expected cellulose carbamate R—NH—CO—O-cellulose.

After this pretreatment, the dye is introduced into the reactor, in which the temperature and pressure conditions used previously in step a) are applied a second time. The properties of supercritical $CO_2$ allow it to diffuse, transport and distribute homogeneously the dye molecules within the "mattress" of cellulose fibers. The dye molecules then become adsorbed onto the hydrocarbon-based units, i.e. the hydrocarbon-based chains or the cyclic hydrocarbon-based radicals of the cellulose carbamate. The pressure is then reduced slowly and heating is stopped. A cellulose substrate dyed to the core is then obtained.

According to a second embodiment variant, the treatment of cellulose with the primary organourea may be performed in solvent medium, in particular aqueous medium, especially in the presence of dimethyl sulfoxide (DMSO).

According to this embodiment, the pretreated cellulose in the form of cellulose carbamate is then placed in contact with the dye in a reactor fed with supercritical $CO_2$. The temperature and pressure conditions applied, which are identical to those described previously, are also maintained so as to allow good diffusion and homogeneous distribution of the hydrophobic organourea and dye molecules to the core of the cellulose substrate. This treatment makes it possible to obtain a substrate dyed to the core with the dye molecules adsorbed onto the hydrocarbon-based chains or the cyclic hydrocarbon-based radicals of the cellulose carbamate. The pressure is then reduced slowly and heating is stopped. The dyed substrate is then removed from the autoclave.

According to a second embodiment, steps (a) and (b) are performed concomitantly.

According to this embodiment, the autoclave is charged with a cellulose substrate, the primary organourea and also the chosen hydrophobic dye. The autoclave is sealed and then charged with liquid $CO_2$. The temperature and pressure are adjusted so as to convert the liquid $CO_2$ into supercritical $CO_2$, which diffuses and transports the organourea and also the dye into the mattress of cellulose fibers. After stabilizing the system, the reactor is kept under these conditions so as to allow good diffusion and homogeneous distribution of the hydrophobic organourea and dye molecules to the core of the cellulose substrate. The pressure is then reduced slowly and heating is stopped. A cellulose substrate dyed to the core is then obtained.

The temperature applied in steps a) and b) is advantageously between 100 and 140° C., preferably between 120° C. and 130° C.

Moreover, the pressure applied in steps a) and b) is advantageously between 250 bar and 350 bar, preferably between 280 bar and 320 bar.

In particular, the temperature and pressure conditions applied in steps a) and b), performed successively or concomitantly, are maintained for a time ranging from 1 minute to 60 minutes, more particularly from 10 minutes to 40 minutes.

In particular, the process according to the invention is advantageously performed under anhydrous conditions. For the purposes of the invention, the term "anhydrous conditions" means that the reaction media are not supplemented with water. The water naturally contained in the cellulose does, however, remain present.

Advantageously, the process according to the invention does not require the use of surfactant.

In particular, the cellulose substrate is a paper.

Applications

The process under consideration according to the invention may be performed so as to treat cellulose fibers forming different substrates.

Thus, they may especially be papers or textiles.

In the paper and textile industries, such a process allows paper to be colored via an ecological implementation, and produces a substrate dyed to the core, having good persistence of the color over time.

In particular, a textile obtained according to the process of the invention has very good resistance especially to washing and friction.

With regard to its functionalization with carbamate units, the paper obtained according to the invention may advantageously lend itself to related modifications. Thus, it may be possible also to give it hydrophobic properties, or oleophobic properties via consecutive grafting with suitable chemical units.

A colored, hydrophobic cellulose substrate is especially advantageous in the textile industry. This property may be used for making protective overcoats.

This property may be useful, for example, in the marine sector for making maps, which are liable to come into contact with water.

Similarly, a colored, oleophobic cellulose substrate may be particularly advantageous, for example, in the catering sector for cookery books and protective clothing.

The process according to the invention may also be performed during the manufacture of tracing papers, for example.

A tracing paper is a paper that is particularly dense and hard when compared with the majority of the other forms of paper. Consequently, it is a fragile paper that is liable to tear easily when it is folded. Such a treatment in the presence of a primary organourea in sCO$_2$ medium makes it possible to obtain a paper that has better resistance to folding, to stretching, and also to water.

REFERENCES

[1] Yin, C. et al., Carbohydrate Polymers, 2007, 67, 147-154

[2] Wertheim, E., JACS, 1931, 53(1), 200

EXAMPLE 1

Coloring of a Blotting Paper in Two Steps, With the Dye Disperse Red 13®

An autoclave, of microreactor type, is charged with 1.62 g of blotting paper and 162 mg of octadecylurea. The reactor is sealed and then charged with liquid CO$_2$.

The temperature and pressure conditions are adjusted, inside the reactor, so as to reach a temperature of 130° C. and a pressure of 280 bar. After stabilizing the system, the reactor is kept for 10 minutes under these conditions. On conclusion of this pretreatment, the cellulose carbamate is obtained.

100 mg of Disperse Red 13® dye are then introduced into the reactor. The same temperature and pressure conditions as those used previously are applied a second time for 10 minutes. The pressure is then reduced slowly and heating is stopped. The paper obtained, which is dyed to the core, is then removed from the autoclave.

The liquid CO$_2$ and the excess dye are readily separated and can be reused.

EXAMPLE 2

Coloring of a Blotting Paper in a Single Step, With the Dye Disperse Red 13®

An autoclave is charged with 1.62 g of blotting paper, 162 mg of octadecylurea and 100 mg of Disperse Red 13® dye. The autoclave is sealed and then charged with liquid CO$_2$.

The temperature is adjusted to 130° C. and the pressure to 280 bar so as to convert the liquid CO$_2$ into supercritical CO$_2$.

After stabilizing the system, the reactor is kept under these conditions for 10 minutes. The pressure is then reduced slowly and heating is stopped. The paper obtained, which is dyed to the core, is then removed from the autoclave.

The liquid CO$_2$ and the excess dye are readily separated and may be reused.

EXAMPLE 3

Coloring of a Blotting Paper With the Dye Foron Bleu RD-E®

An autoclave is charged with 1.20 g of blotting paper, 100 mg of octadecylurea and 100 mg of Foron Bleu RD-E® dye. The autoclave is sealed and then charged with liquid CO$_2$.

The temperature is adjusted to 120° C. and the pressure to 310 bar so as to convert the liquid CO$_2$ into supercritical CO$_2$.

After stabilizing the system, the reactor is kept under these conditions for 10 minutes. The pressure is then reduced slowly and heating is stopped. The paper obtained, which is dyed to the core, is then removed from the autoclave.

EXAMPLE 4

Coloring of a Blotting Paper With the Dye Disperse Red 13®

An autoclave is charged with 1.25 g of blotting paper, 100 mg of 4-methoxyphenylurea and 100 mg of Disperse Red 13® dye. The autoclave is sealed and then charged with liquid CO$_2$.

The temperature is adjusted to 120° C. and the pressure to 260 bar so as to convert the liquid CO$_2$ into supercritical CO$_2$.

After stabilizing the system, the reactor is kept under these conditions for 10 minutes. The pressure is then reduced slowly and heating is stopped. The paper obtained, which is dyed to the core, is then removed from the autoclave.

EXAMPLE 5

Coloring of a Blotting Paper With the Dye Disperse Red 19®

An autoclave is charged with 1.15 g of blotting paper, 100 mg of 4-methoxyphenylurea and 100 mg of Disperse Red 19® dye. The autoclave is sealed and then charged with liquid CO$_2$.

The temperature is adjusted to 140° C. and the pressure to 280 bar so as to convert the liquid CO$_2$ into supercritical CO$_2$.

After stabilizing the system, the reactor is kept under these conditions for 10 minutes. The pressure is then reduced slowly and heating is stopped. The paper obtained, which is dyed to the core, is then removed from the autoclave.

The invention claimed is:

1. A process for coloring cellulose in supercritical CO$_2$ medium with a hydrophobic dye, comprising at least the steps:
   (i) providing cellulose fibers,
   (ii) placing said cellulose fibers in contact with:
      a) an effective amount of at least one uncharged primary monoorganourea selected from the group consisting of 4-methoxyphenylurea and octadecylurea, under conditions suitable for establishing a covalent bond of carbamate type between the cellulose and each molecule of said organourea; and
      b) at least one hydrophobic dye, in supercritical CO$_2$ medium, under conditions suitable for immobilizing said dye on said fibers.

2. The process as claimed in claim 1, in which the operations for placing in contact in steps a) and b) are performed successively.

3. The process as claimed in claim 2, in which step a) is performed in solvent medium, and step b) is performed in supercritical CO$_2$ medium.

4. The process as claimed in claim 2, in which step a) is performed in solvent medium in the presence of dimethyl sulfoxide, and step b) is performed in supercritical CO$_2$ medium.

5. The process as claimed in claim 1, in which the operations for placing in contact in steps a) and b) are performed concomitantly.

6. The process as claimed in claim 1, in which the supercritical $CO_2$ medium is generated in situ by heating liquid $CO_2$ under pressure.

7. The process as claimed in claim 1, in which the operations for placing in contact under consideration in steps a) and b) are performed in a same reactor.

8. The process as claimed in claim 1, in which a concentration of primary organourea is between 1% and 20% by weight relative to a weight of cellulose to be treated.

9. The process as claimed in claim 1, in which a concentration of dye is between 1% and 20% by weight relative to a weight of cellulose to be treated.

10. The process as claimed in claim 1, in which a temperature applied in steps a) and b) is between 100° C. and 140° C.

11. The process as claimed in claim 1, in which a pressure applied in steps a) and b) is between 250 bar and 350 bar.

12. The process as claimed in claim 1, in which a temperature and pressure conditions applied in steps a) and b), performed successively or concomitantly, are maintained for a time ranging from 1 minute to 60 minutes.

13. The process as claimed in claim 1, in which the cellulose is a paper cellulose.

14. The process as claimed in claim 1, in which a temperature applied in steps a) and b) is between 120° C. and 130° C.

15. The process as claimed in claim 1, in which a pressure applied in steps a) and b) is between 280 bar and 320 bar.

16. The process as claimed in claim 1, in which a temperature and pressure conditions applied in steps a) and b), performed successively or concomitantly, are maintained for a time ranging from 10 minutes to 40 minutes.

17. The process as claimed in claim 1, wherein the at least one uncharged primary monoorganourea is 4-methoxyphenylurea.

18. The process as claimed in claim 1, wherein the at least one uncharged primary monoorganourea is octadecylurea.

* * * * *